(12) United States Patent　　(10) Patent No.:　　US 9,139,785 B2
　Tsantrizos　　　　　　　　　　　　　　　(45) Date of Patent:　　Sep. 22, 2015

(54) METHOD AND APPARATUS FOR GASIFICATION OF ORGANIC WASTE IN BATCHES

(75) Inventor: Panayotis Tsantrizos, Montreal (CA)

(73) Assignee: PROTERRGO, INC., Montreal, QC (CA)

( * ) Notice: Subject to any disclaimer, the term of this patent is extended or adjusted under 35 U.S.C. 154(b) by 1260 days.

(21) Appl. No.: 12/445,455

(22) PCT Filed: Oct. 12, 2007

(86) PCT No.: PCT/IB2007/054148
§ 371 (c)(1),
(2), (4) Date: Jan. 25, 2010

(87) PCT Pub. No.: WO2008/044216
PCT Pub. Date: Apr. 17, 2008

(65) Prior Publication Data
US 2010/0139534 A1　　Jun. 10, 2010

Related U.S. Application Data

(60) Provisional application No. 60/829,314, filed on Oct. 13, 2006, provisional application No. 60/829,315, filed on Oct. 13, 2006, provisional application No. 60/829,939, filed on Oct. 18, 2006.

(51) Int. Cl.
*F23B 70/00*　　(2006.01)
*B09B 3/00*　　(2006.01)
(Continued)

(52) U.S. Cl.
CPC .... *C10J 3/44* (2013.01); *C10J 3/04* (2013.01); *C10J 3/723* (2013.01); *C10K 1/003* (2013.01);
(Continued)

(58) Field of Classification Search
None
See application file for complete search history.

(56) References Cited

U.S. PATENT DOCUMENTS

| 4,152,122 A | 5/1979 | Feldmann |
| 4,308,807 A | 1/1982 | Stokes |

(Continued)

FOREIGN PATENT DOCUMENTS

| CA | 2028915 C | 5/1991 |
| CA | 2424805 | 10/2004 |

(Continued)

OTHER PUBLICATIONS

Batterman, "Assessment of small-scale incinerators for health care waste" Department of Environmental Health Science, University of Michigan, published Jan. 2004.

(Continued)

*Primary Examiner* — Melvin C Mayes
*Assistant Examiner* — Sheng H Davis
(74) *Attorney, Agent, or Firm* — Anglehart et al.

(57) ABSTRACT

A gasification reactor for processing organic waste in batches comprises a primary gasification reactor (62) that includes a primary gasification chamber (18) and a surrounding combustion chamber (19), a secondary gasification chamber (21), a synthesis gas decontamination unit (42) and a combustible gas selector (41). The waste is loaded into the primary gasification chamber through a latched opening and heated from the combustion of a fuel in the combustion chamber (19) to convert the waste to a synthesis gas. The gasification chamber (18) has an intake (20) for introducing pre-heated process air (1) therein. The combustion chamber operates either with a conventional fuel (9) or with the produced synthesis gas (6). The secondary gasification chamber (21) thermally treats the synthesis gas (2) to eliminate tars. The decontamination unit (42) scrubs the synthesis gas of contaminants including particulates and acid gases. The clean synthesis gas (6) is directed to the combustible gas selector (41) which selectively feeds either the combustible fluid (9) or the synthesis gas (6) to the burner (40).

21 Claims, 3 Drawing Sheets

(51) Int. Cl.
    *B01J 8/00*    (2006.01)
    *C10J 3/44*    (2006.01)
    *C10J 3/04*    (2006.01)
    *C10J 3/72*    (2006.01)
    *C10K 1/00*    (2006.01)
    *C10K 1/10*    (2006.01)
    *C10K 1/20*    (2006.01)
    *C10K 1/32*    (2006.01)

(52) U.S. Cl.
    CPC .................. *C10K 1/007* (2013.01); *C10K 1/101* (2013.01); *C10K 1/20* (2013.01); *C10K 1/32* (2013.01); *C10J 2300/0946* (2013.01); *C10J 2300/1215* (2013.01); *C10J 2300/1246* (2013.01)

(56) References Cited

U.S. PATENT DOCUMENTS

| | | | |
|---|---|---|---|
| 4,756,722 A * | 7/1988 | Knop et al. ................ 48/73 |
| 4,764,185 A | 8/1988 | Mayer |
| 4,828,581 A | 5/1989 | Feldmann |
| 4,941,415 A | 7/1990 | Pope et al. |
| 5,257,497 A | 11/1993 | Firey |
| 5,266,086 A | 11/1993 | Bailey et al. |
| 5,423,891 A | 6/1995 | Taylor |
| 5,470,361 A | 11/1995 | Linke |
| 5,534,659 A | 7/1996 | Springer |
| 5,553,554 A | 9/1996 | Urich, Jr. |
| 5,619,935 A | 4/1997 | Wilson |
| 5,770,017 A | 6/1998 | Brown |
| 5,868,085 A | 2/1999 | Hansen |
| 5,922,090 A | 7/1999 | Fujimura et al. |
| 5,941,184 A | 8/1999 | Casacia |
| 6,032,467 A | 3/2000 | Oshita |
| 6,076,476 A | 6/2000 | Yano et al. |
| 6,084,147 A | 7/2000 | Mason |
| 6,448,441 B1 * | 9/2002 | Wing-Chiu et al. ............ 564/67 |
| 6,613,111 B2 | 9/2003 | Paisley |
| 6,648,932 B1 | 11/2003 | Maton |
| 6,746,497 B1 | 6/2004 | Kaneko |
| 6,790,383 B2 | 9/2004 | Kim |
| 6,822,126 B2 | 11/2004 | Miller |
| 6,837,910 B1 | 1/2005 | Yoshikawa |
| 6,962,117 B2 | 11/2005 | Barry |
| 7,381,383 B1 | 6/2008 | Yokoyama et al. |
| 2003/0233788 A1 * | 12/2003 | Lewis ................ 48/197 A |
| 2004/0050067 A1 | 3/2004 | Sprouse et al. |
| 2005/0166810 A1 | 8/2005 | Gnedenko et al. |
| 2006/0065172 A1 | 3/2006 | Capote et al. |
| 2006/0089516 A1 | 4/2006 | Giercke |
| 2006/0101715 A1 | 5/2006 | Vlok et al. |
| 2006/0112639 A1 * | 6/2006 | Nick et al. .................. 48/198.1 |
| 2007/0099039 A1 * | 5/2007 | Galloway ....................... 429/19 |
| 2007/0220810 A1 * | 9/2007 | Leveson et al. .......... 48/197 FM |
| 2008/0196308 A1 * | 8/2008 | Hutton et al. .................. 48/210 |
| 2008/0222956 A1 * | 9/2008 | Tsangaris et al. ................ 48/77 |
| 2008/0282946 A1 | 11/2008 | Morandi |
| 2008/0308017 A1 | 12/2008 | Brookes |
| 2009/0031930 A1 | 2/2009 | Shen |
| 2009/0060779 A1 | 3/2009 | Chambe et al. |
| 2009/0200180 A1 | 8/2009 | Capote et al. |
| 2010/0006415 A1 | 1/2010 | Lee |
| 2010/0139534 A1 | 6/2010 | Tsantrizos |
| 2011/0107669 A1 | 5/2011 | Carabin et al. |

FOREIGN PATENT DOCUMENTS

| | | | |
|---|---|---|---|
| CA | 2623978 A1 | | 4/2007 |
| CA | 2651406 A1 | | 11/2007 |
| CA | 2688080 A1 | | 12/2008 |
| EP | 1108995 A1 | | 6/2001 |
| EP | 1382906 A2 | | 1/2004 |
| JP | 60-162116 A | | 8/1985 |
| JP | 63-044921 A | | 2/1988 |
| JP | 10185135 A | | 7/1998 |
| JP | 11-159718 A | | 6/1999 |
| JP | 2001-341129 A | | 12/2001 |
| JP | 2005-517886 A | | 6/2005 |
| JP | 2006-343002 A | | 12/2006 |
| JP | 2007-298251 A | | 11/2007 |
| JP | 2008039365 A | | 2/2008 |
| KR | 100846897 B1 | | 7/2008 |
| WO | WO9640843 | * | 12/1996 |
| WO | WO 02/083815 A1 | | 10/2002 |
| WO | WO 99/66008 A1 | | 10/2002 |
| WO | 2005026296 | | 3/2005 |
| WO | 2005047435 | | 5/2005 |
| WO | 2005047771 | | 5/2005 |
| WO | WO2008044216 A1 | | 4/2007 |

OTHER PUBLICATIONS

"Facts about the ban on small, on-site incinerators", AQ Doc. #4. May 10, 1998, Minnesota Pollution Control Agency, St-Paul, MN.
International Preliminary Report on Patentability in PCT/CA2010/000545.
International Search Report in PCT/CA2010/000545.
Written Opinion in PCT/CA2010/000545.
International Search Report.
Search Report and Opinion of EP application 10764011.2 dated Oct. 10, 2013 with related claims 1-15.
CA 2666431 office action dated Dec. 17, 2013 with related claims.
EP 07826714.3 office action dated Oct. 2, 2013 with related claims.
JP 2012-505004 office action dated Apr. 8, 2014 with related claims.

* cited by examiner

FIG_2

METHOD AND APPARATUS FOR GASIFICATION OF ORGANIC WASTE IN BATCHES

FIELD OF THE INVENTION

This invention relates to waste treatment and to gasification of organic material. More specifically, it relates to an improved method and apparatus for the gasification of organic waste in batches.

BACKGROUND OF THE INVENTION

For most people, waste management involves mostly taking the garbage out of their home where it is picked up by a municipal service and taken to an authorized large-scale waste processing facility. However, many small communities live in isolation, as far as waste management is concerned (either due to geographic location or because of the nature of waste generated), and must treat their waste locally. Small isolated communities can be found anywhere and may include military and commercial ships, research and military outposts, northern communities, small islands, resorts, clinics and hospitals, laboratories, industries and many others.

A typical example of an isolated community is a ship at sea (for example a cargo ship or a navy vessel). Sailors on board (of which there may be several dozen or several hundred) typically generate around 1 kilogram of waste per sailor per day and are out at sea for weeks at a time. These ships must choose between throwing their waste into the sea, storing it on board, or treating it on board. All of these options have serious problems associated with them.

The disposal of waste into the sea is restricted and the disposal of some waste, like plastic, is forbidden everywhere. On-board storage of waste can cause serious health problems, infestations by rodents, may require large refrigerated containers, and many ports will not accept the waste or will charge high commissions for the final disposal. Furthermore ships may be operating in coastlines of hostile countries, making the possible transfer of the waste to a port facility impossible. Existing methods for on-board disposal (primarily incineration) are incapable of disposing of the waste without producing harmful or toxic emissions (such as dioxins arising from the combustion of plastics).

A similar situation exists for isolated northern habitats with permafrost conditions. Landfill as a method of disposal is unacceptable (lack of biodegradation), shipping of the waste for treatment elsewhere involves exorbitant costs, and incineration in pits or small systems generates toxic emissions. Many islands face similar problems; land is at a premium and therefore landfilling as well as shipment of the waste elsewhere are not attractive options.

Generally, people pay to have their waste taken away in a manner that is usually controlled by the local government. Because this practice is so prevalent throughout the world, nearly all of the technologies that are either used commercially or under development are aimed at processing large quantities of waste in a manner that is economically feasible and environmentally acceptable. Thus, there are very few small-scale options available today for treatment of waste in isolated habitats. The systems that are available are either not compact and/or not environmentally safe, and require the use of significant amounts of externally provided energy. Available approaches for waste disposal in isolated human habitats can be separated into two categories: those that change the physical form of the waste and those that modify the chemical form.

The approaches that modify only the physical form include technologies such as compactors, shredders, pulpers and plastic processors. Generally, these approaches aim to reduce the volume of the waste, or prepare the waste so that it can be disposed of at a later date or in a different location (for example in certain approved areas of the ocean). As well, these approaches may be used to isolate problematic portions of the waste (for example plastic which cannot be disposed of at sea) until it can be properly disposed of. These approaches bear no relation to the present invention from a technological point of view; they are discussed here only because they represent some of the few waste treatment options available to isolated communities.

The invention disclosed herein is related to other technologies aimed at modifying the chemical form of the waste and specifically those causing the thermal oxidation of all organic waste. Pyrolysis, gasification and incineration (or combustion) are the main thermal processes used to modify the chemical form of waste; they are well known and used widely around the world. There are numerous patents describing all manners of operating these processes (usually on a continuous basis rather than batch operation) to improve their efficiency, reduce their environmental impact, process different types of waste, etc.

Pyrolysis operates in the complete absence of oxygen and thermally decomposes the organic waste into a carbon based char and a mixture of oils. It is not a process that is suitable for small scale waste treatment. Neither the char nor the mixture of oils can be used by a small isolated community. As such, pyrolysis is a viable process only for relatively large scale operations and for the treatment of specialty waste such as scrap tires and plastics.

An early example of a pyrolysis processes which is used for the treatment of waste to produce methane gas is disclosed in U.S. Pat. No. 4,152,122 (Apparatus for the production of methane containing gas by hydrogasification) was published in 1979. It describes various efforts to improve the energy efficiency of the process by using the sensible heat of the gas produced by pyrolysis and gasification to dry the waste. While this patent is not related to the technology disclosed herein, it shows early efforts to manage the energy balance of a thermal waste treatment furnace.

In 1982, U.S. Pat. No. 4,308,807 (Apparatus for pyrolysis of municipal waste utilizing heat recovery) describes similar efforts to improve the energy efficiency of the process by using the energy contained within the waste. This patent discloses a pyrolysis process in which some of the hydrocarbon gases produced by the pyrolysis of waste are combusted as the fuel and used to operate the pyrolysis reactor. This is somewhat similar to the idea being disclosed herein, in that it uses the fuel produced by the process to drive the process. However, in this patent, which does not target small scale applications, only a small fraction of the energy in the waste is used within the process and there is nothing similar to the small batch gasification reactor being disclosed by the present invention.

Another pyrolysis reactor was described in 1999, in U.S. Pat. No. 5,868,085 (Pyrolytic waste treatment system). This patent also discloses efforts to recover some of the heat in the process by introducing fully combusted gases that were initially used to heat the pyrolysis furnace inside the pyrolysis furnace to improve energy transfer and overall efficiency. Again, there is no effort to create a small scale system and there is no heat management system such as the one being disclosed by the present invention.

Another effort to improve the efficiency of a pyrolysis reactor used for the treatment of waste is disclosed in 2000, in U.S. Pat. No. 6,084,147 (Pyrolytic decomposition of organic waste). In this patent, a novel pyrolysis reactor is described which uses pre-heated amorphous alumina beads to heat-up and agitate the waste, and thus increase the rate of treatment. This is typical of the approaches which are commonly used to increase the efficiency of large scale thermal treatment technologies. Invariably, the system's complexity is increased in an effort to improve processing rate and energy efficiency. This is opposite to what is described in the present disclosure which discloses a very simple technology without emphasis on processing rate.

Generally, there has not been any disclosure of a pyrolysis furnace that has been designed specifically for the treatment of small amounts of waste. More typical for small scale pyrolysis would be the one described in US Patent Application Publication No: US2003/0199718A1 (Process for Converting Waste Plastic into Lubrication Oils) in which the process is more focused on the production of a specific product (such as lubrication oils in this case or carbon black in the pyrolysis of scrap tires) and less on the elimination of waste. No pyrolytic reactor that is similar to the MAGS reactor has ever been disclosed.

Gasification is a process in which a controlled amount of oxygen is used to convert the organic molecules in the waste into a synthesis gas containing mostly carbon monoxide and hydrogen. Gasification has been practiced for more than 200 years and a number of attempts have been made to develop an efficient and maintenance free gasification reactor.

As early as 1988, U.S. Pat. No. 4,764,185 (Gasifier apparatus) describes a gasifier that is designed for improved efficiency and reduced maintenance.

In 1989, U.S. Pat. No. 4,828,581 (Low inlet gas velocity high throughput biomass gasifier) describes a high throughput gasification process that uses inert sand to improve energy efficiency. The hot sand and a certain amount of air are used to convert the waste into a synthesis gas and a certain amount of char. Subsequently, the sand and the char are moved to a separate chamber and the char is burned to heat up the sand.

In 1995, U.S. Pat. No. 5,423,891 (Method for direct gasification of solid waste materials) also discloses a gasification reactor that uses pre-heated solids to improve the gasification rate.

While most technologies focused on means of increasing the processing rate of the gasification process, some also focused on producing a clean synthesis gas that could be used commercially. One such technology is described in 1995 in U.S. Pat. No. 5,470,361, in which methods are disclosed for removing HCl, sulfur compounds and dust from the synthesis gas.

In 1996, another disclosure, U.S. Pat. No. 5,534,659 (Apparatus and method for heating hazardous waste) describes a gasification furnace that is designed for higher processing rate and better environmental performance. The reactor described in this patent uses a plasma torch to heat the waste to very high temperatures and to melt the inorganic fraction of the waste into slag. This technology is perhaps the natural conclusion of various efforts to improve gasification by making a reactor that offers high processing rates and complete treatment.

Also in 1996, U.S. Pat. No. 5,553,554 (Waste disposal and energy recovery system and method) describes a process in which waste is converted into synthesis gas inside a rotary kiln gasifier. The reactor design may be different than that used in other processes, but this disclosure is typical of commercial gasification technologies. The synthesis gas produced is burned in a separate vessel to recover its energy content and to produce either steam or hot water.

An innovative thermal treatment reactor for waste is described in 1998 in U.S. Pat. No. 5,770,017 (Method for ablative heat transfer). In this reactor, the solid waste is introduced into a helically shaped vessel and conveyed through the vessel at a velocity that maintains contact between the waste and the wall. This significantly improves heat transfer to the waste and thus increases the gasification rate of the waste.

Generally, all technologies described to date on the gasification of waste are similar to the one described in 2000 in U.S. Pat. No. 6,032,467 (Method and apparatus for recovering energy from wastes). In this patent, a gasification process is described that uses a fluidized-bed reactor and a melting furnace to convert the waste into a synthesis gas. The synthesis gas is then cleaned and used to produce electricity. While the type of gasification reactor may be different from process to process, all gasification technologies disclosed to date are designed for large processing rates and the use of synthesis gas for the generation of energy, most often, electricity.

In 2003, U.S. Pat. No. 6,613,111 (Small scale high throughput biomass gasification system and method) describes a technology that uses the energy produced by the combustion of a synthesis gas to gasify waste and produce more synthesis gas. The gasification and combustion chambers described in U.S. Pat. No. 6,613,111 are concentric and the heat from the combustor is used to provide the energy needed for gasification. In the technology described in U.S. Pat. No. 6,613,111, sand is used as the heat transfer medium. Sand is heated up in the combustion zone and then transferred to the gasifier to heat up the waste. Both the combustor and the gasifier are fluidized bed reactors designed for high processing rates. In fact, the waste processing rate for this system is given at 500 to 4400 lbs/hr per square foot of the gasification reactor's diameter.

Another innovation related to gasification is disclosed in 2004 in U.S. Pat. No. 6,790,383 (Method of gasifying carbonaceous materials). While the system described in this patent is used for the processing of coal, shredded tires and waste oils, it may be adaptable to be used with municipal solid waste. In this disclosure, a process is described which uses some of the synthesis gas produced by gasification to provide energy for the gasification process. Specifically, some of the carbon monoxide and hydrogen in the synthesis gas are recycled into the gasification furnace where they are combusted fully to carbon dioxide and water. The energy released from the combustion of the synthesis gas is used by the gasification process. This disclosure, similarly to U.S. Pat. No. 6,613,111, teaches that the energy content of the synthesis gas can be used to convert waste into more synthesis gas.

To date, nearly all efforts to design a very small waste treatment system have been based on incineration. In incineration, the organic waste is mixed with excess air and a combustible fuel. Consequently, the waste is completely burned and all carbon is converted to carbon dioxide. In large conventional incinerators, the hot exhaust gas is used first to recover energy and then cleaned prior to being released into the environment. Incineration is the main thermal treatment technology used commercially for the elimination of waste and the recovery of energy from the waste.

There have been a number of efforts to design a very small scale incinerator, including some that have been successfully commercialized. For example, many ships use small incinerators to treat solid waste. Additionally, small incinerators have been used by many farms to dispose of animal carcass waste and hospitals for the disposal of biomedical waste. Primarily, small incinerators use conventional technologies and many are "home-made". In fact, in many parts of the world, from Alaska to Africa governments provide instructions to citizens on how to build small incinerators for local use.

The 1997 U.S. Pat. No. 5,619,935 (Portable incinerator heat recovery device and method of use) describes a modification to a conventional small (portable) incinerator. The innovation described in this patent relates to a device designed to recover some heat from the combustion of waste. Another technology described in 1999, in U.S. Pat. No. 5,941,184 (Controlled thermal oxidation for organic waste), relates to methods for minimizing the polluting emissions from small scale incinerators. In this 1999 patent, the direction of the air flow through the incinerator is controlled and a secondary combustion stage is used to reduce emissions.

All small-scale incinerators are characterized by numerous operating and environmental problems which make them not suitable for eliminating the waste of small isolated communities. In fact, in the study completed for the World Health Organisation (WHO) by Batterman, S. entitled "Assessment of small-scale incinerators for health care waste", from the Department of Environmental Health Sciences, University of Michigan, published in January 2004, it is concluded that no small-scale incinerator available today meets current environmental protection regulations. Awareness of the inadequacy of small incinerators is growing; for example the Minnesota Pollution Control Agency has placed a ban on the use of small, poorly controlled and operated incinerators, which are estimated to be responsible for 93% of the dioxin emission from waste combustors in Minnesota. See "Facts about the ban on small, on-site incinerators", AQ Doc. #4.10, May 1998 by the Minnesota Pollution Control Agency, St. Paul, Minn.

There is information found in literature describing efforts to increase the efficiency of incinerators by using the heat by-products of the same incinerators. However, in 2005, U.S. Pat. No. 6,962,117 (Method and apparatus for controlling combustion in a furnace) describes an incinerator which the flue gas generated by the burning in the combustion zone is recirculated back to the combustion zone in order to reduce the temperature in the combustion zone and avoid the melting of the ash.

SUMMARY OF THE INVENTION

According to a first aspect of the invention, there is provided a waste gasification system that can be manually loaded with a small batch quantity of organic waste, such as a garbage bag produced by an average household, for processing.

According to a second aspect of the invention, there is provided a reactor for gasification of organic waste in batch that generates a crude synthesis gas and is capable of sustaining the gasification on the synthesis gas produced.

According to a third aspect of the invention, there is provided a closed primary gasification chamber having a controlled process air inlet and a crude synthesis gas outlet, with said primary gasification chamber having a latched hatch adapted to admit placement of bags of mixed organic waste in the chamber.

According to a fourth aspect of the invention, there is provided a primary combustion chamber surrounding the primary gasification chamber and providing heat to said primary gasification chamber.

According to a fifth aspect of the invention, there is a secondary gasification chamber receiving the crude synthesis gas exiting the primary gasification chamber and thermally treating the crude synthesis gas to reduce its tar content and produce an outlet synthesis gas.

According to a sixth aspect of the invention, there is a decontamination unit for decontaminating the synthesis gas.

According to a seventh aspect of the invention, there is a synthesis gas management system for managing the cleaned synthesis gas exiting the decontamination unit and controlling the amount of synthesis gas that is combusted in the primary combustion chamber versus the synthesis gas that is directed to other uses or to an afterburner.

In the present invention, the term "organic waste" is understood as meaning waste such as household, office, industrial and medical waste comprising at least some organic material, such as paper, plastic, food, cloth, wood, oils, and other carbon based materials, that is suitable for generating synthesis fuel gas such as $H_2$ and CO. When organic waste contains metals, glass, soil or ceramics, most of these materials will not gasify and will remain as residue.

One objective of the invention is to provide an inexpensive, small, simple to operate, non-polluting waste treatment system (comprised of equipment and a process) making it feasible for individuals or small groups of individuals to safely dispose of their waste. The small waste treatment system disclosed herein, named micro auto-gasification system or MAGS, recovers energy contained in the organic waste and uses it as a source of fuel for the process, rendering it almost independent of external energy sources. No such systems are currently available, and the MAGS would be especially useful for small isolated communities having limited resources and no access to municipal or other waste disposal services (e.g. ships, remote communities, small islands, resorts, etc.). As well, the system would be useful for groups producing waste whose hazardous nature prevents it from being processed along with regular waste (e.g. biomedical waste, pharmaceuticals, etc.).

The Micro Auto Gasification System (MAGS) consists of a unique stainless steel primary gasification reactor and is based on the low-temperature (700 to 800° C.) gasification of organic waste material. The waste is placed inside the vessel. Process air passes in a channel between the wall enclosing the primary gasification chamber and the surrounding wall enclosing the primary combustion chamber where it is heated prior to being introduced into the primary gasification chamber where it is used to gasify the waste. The resulting off-gas, containing a mixture of hydrocarbons, commonly known as tars, along with hydrogen and carbon monoxide, is heated further to about 800° C. in a secondary gasification chamber to reduce the tars and produce more hydrogen, carbon monoxide and carbon soot. The off gas from the secondary gasification chamber, containing mostly hydrogen and carbon monoxide and commonly known as synthesis gas, is treated to remove any contaminants, such as acid gases and particulates, and then it is burned between in the primary combustion chamber. The burning of the clean synthesis gas provides the energy needed to preheat the process air and the reactor walls and, thus, gasify the waste. Thus, the overall batch process uses the synthesis gas produced from the gasification of waste to gasify the waste itself and produce more synthesis gas. It is for this reason that the process has been named auto-gasification.

The system, which occupies a space of only 10 cubic meters, including the synthesis gas cleaning system, has the ability to eliminate about 40 kg of waste per batch. Each batch takes about two hours to complete the process cycle. The operation is very simple and has minimum utility requirements. Consequently, this technology is ideal for use by any group of people that produce a few hundred kilograms of waste per day and must treat their own waste locally without causing environmental damage.

The key innovations of the Micro Auto Gasification System (MAGS) are: (i) a small organic waste elimination system that can be operated by anyone by simply manually loading common garbage bags into a drum, closing the cover of the drum and pressing a start button; (ii) a primary gasification reactor, that efficiently uses clean synthesis gas produced by the gasification of organic waste to both preheat the process air used for gasification and heat the waste to the desired gasification temperature; (iii) a secondary gasification chamber that ensures the elimination of any tars from the synthesis gas; and (iv) a compact synthesis gas cleaning system that allows the use of the fuel produced by the process to provide the energy needed for the process. Overall, the system is designed to be extremely compact, reliable and easy to operate, and have minimum utility requirements.

The main waste processing vessel for the MAGS technology is the primary gasification reactor. The reactor is manufactured using a material that has good oxidation and corrosion resistance at temperatures in excess of 850° C. (or 1,562° F.), such as 316 stainless steel or one of various commonly used nickel based superalloys. The primary gasification reactor consists of the primary gasification chamber, the primary combustion chamber and the heat exchanger that allows the process air to be pre-heated using the hot combustion exhaust. The walls of the reactor are concentric to each other and have a space between each of them that allows air or other gases to pass between the walls. All walls of the reactor are maintained hot at temperatures of around 750° C.

The MAGS process operates on a batch basis. The maximum weight of a typical batch is about 40 kilograms, but the process can run effectively with a smaller batch. The waste, still in its original garbage bag and without any pretreatment, is manually placed inside the MAGS primary gasification chamber, which also serves as the reactor's gasification zone. The MAGS technology can be used for the treatment of any organic waste, including food, paper and cardboard, plastics, wood, oils, cloth, drugs and pharmaceuticals, animal carcass, solvents, etc. Any metal or glass that accidentally enters the MAGS will be sterilized but remain in its original form and composition and may be recovered from the ash and recycled. Household waste can be bagged and the full bags can be placed inside the reactor without any other processing.

A controlled amount of air, which corresponds to the air needed to gasify the waste, is passed through a channel located in the space between the primary gasification chamber and the primary combustion chamber. This air, which may be called the process air, is preheated using the hot exhaust from the primary combustion chamber and subsequently released inside the primary gasification chamber where the waste is located. Various means of enhancing heat transfer between the middle wall and the process air are provided, including fins, metal foams or channels, which effectively increase the surface area for heat transfer, as well as the velocity of the process air and, therefore, the overall heat transfer coefficient. The process air exits the space between the two walls and enters the waste gasification zone at a temperature of about 700° C. The hot process air enters the gasification zone at the bottom of the reactor, below the waste, and rises through the waste mass. A mechanical mixing mechanism may also be used at the bottom of the reactor to slowly turn the waste and improve the contact between the process air and the waste which accelerates the rate of gasification.

The organic molecules within the waste, which are heated by both the hot internal reactor wall and the pre-heated process air, react with the oxygen in the process air to "gasify" into a mixture of carbon monoxide and hydrogen. Along with the products of gasification, nitrogen, which is introduced into the gasifier as part of the process air, is found in the synthesis gas. The final synthesis gas produced within the gasification zone of the reactor is a volumetric mixture of about 50% nitrogen, 25% hydrogen and 25% carbon monoxide. Under certain operating conditions, some of the organic molecules decompose only partially to form smaller volatile hydrocarbons known as tars. The amount of tars produced in the gasification zone depends on the operating temperature and may be significant, especially during start-up when the temperature in the reactor is lower. The synthesis gas exiting the gasification zone also includes certain contaminants, such as HCl, $H_2S$ and particulates. These tars and contaminants must be removed from the synthesis gas prior to its use as a fuel. The options for cleaning the synthesis gas will be discussed below.

The MAGS process needs energy to heat up both the walls of the reactor and the process air. The energy needed for the process is derived from the combustion of a hydrocarbon fuel in a burner located inside the primary combustion chamber. At the beginning of the batch process, a conventional hydrocarbon fuel, such as propane, natural gas or diesel can be used. Once the process begins to produce a significant amount of synthesis gas, the conventional hydrocarbon is replaced with the synthesis gas produced from the gasification of the waste. Thus, an auto-gasification process, as defined in this disclosure, is one in which the waste is thermally transformed into a synthesis gas which, then, is used as the fuel for the transformation process. When all the organic mater in the waste has been gasified, the process stops producing synthesis gas and the batch waste treatment cycle is completed. The process is controlled by assessing the combustion for two things: temperature and oxygen content in the exhaust. If the amount of synthesis gas drops below the amount required by the process, the temperature drops and the oxygen level increases.

Any synthesis gas produced during the gasification that is in excess of what is needed to fuel the gasification of the waste is diverted to other uses or is burned and released into the atmosphere. The process may also be controlled so that no excess synthesis gas is produced. This can be accomplished by reducing the amount of process air fed to the primary gasifier which reduces the mount of synthesis gas produced but extends the time needed to complete the batch cycle.

The space between the inside and the external walls of the primary furnace is the combustion zone. This space is designed in a way that maximizes the heat transfer to the wall of the primary gasification chamber. Fins or channels may be used to effectively increase the surface area for heat transfer as well as the velocity of the combustion exhaust and, therefore, the overall heat transfer coefficient. The temperature of the exhaust combustion gas is maintained at temperatures near 1,000° C.

Overall, the heat in the MAGS primary gasification reactor is transferred from the primary combustion chamber, which surrounds the primary gasification chamber, to both the wall of the primary gasification chamber and to the process air. The desired gasification temperature is about 700° C. Lower gasification temperatures tend to increase the production of tars, which are undesirable. Higher gasification temperatures may cause rapid oxidation of the reactor walls depending on the selected materials. In intermittent service, the maximum operating temperature of 316L stainless steel, which is the preferred material for the fabrication on the MAGS reactor, is 870° C., above which the material experiences rapid oxidation. Thus, the ideal operating temperature range for the walls of the MAGS primary gasification reactor is between 700° C. and 870° C.

Even with relatively good control of the temperature of the primary gasification reactor, some tars may be formed. Tars, which are volatile at the exit temperature of the primary gasification reactor, may condense in cooler sections of the system causing plugging/fouling problems. To eliminate these tars, the crude synthesis gas must be heated to temperatures of 800° C. or higher. This is accomplished in the secondary gasification chamber where the various hydrocarbons in the tars are reduced to primarily hydrogen, carbon monoxide and carbon soot.

An important operation in the MAGS process is the cleaning of the synthesis gas prior to its use as a fuel. Any synthesis gas produced from the gasification of mixed waste will have a certain concentration of acid gases, depending on the composition of the waste being treated. The synthesis gas may also contain other contaminants, such as heavy metals, and fly ash. It is important that all of these potential contaminants are removed from the synthesis gas prior to its use as a fuel in order to avoid releasing pollutants into the environment.

Due to its smaller volume, cleaning of the synthesis gas is preferred over the option of burning the synthesis gas as produced and cleaning the exhaust gas from the combustion zone. The volume of the synthesis gas is about 5 times smaller than the volume of the exhaust gas from the combustor. As such, the gas cleaning equipment for the synthesis gas is significantly smaller than the equipment that would be needed to clean the combustion exhaust.

The operations needed to clean the synthesis gas from contaminants are relatively conventional. The synthesis gas can be either quenched and cleaned cold or cleaned hot. In the cold gas cleaning option the gas is passed through a venturi where it comes in intimate contact with fresh water. This process both removes the particulates from the gas stream and quenches the gas from about 800° C., which is approximately the operating temperature of the secondary gasifier, to about 80° C. Once the synthesis gas has been cooled it passes through a wet scrubber to remove the acid gases. Finally, a demister is used to remove any water droplets from the synthesis gas prior to its use as a fuel. A water ring pump may be used to circulate the synthesis gas and maintain the gasification zone under slightly reduced pressure.

When a wet scrubber is used to clean the synthesis gas, the contaminants, including some tars that may have escaped the secondary gasification treatment will end up in the water effluent from the scrubber. A wastewater treatment system maybe used to eliminate any contaminants from the scrubber effluent prior to its discharge.

The synthesis gas may also be cleaned while still hot using a ceramic filter or an electrostatic precipitator to remove particulates followed by a dry scrubber. The scrubber may be in the form of a replaceable cartridge which contains various solid adsorbing media chosen for their ability to operate at higher temperatures and remove the contaminants. Examples of such cartridges may include activated carbon, molecular sieves, Ca and Mg silicates, and lime-based compounds. All the synthesis gas cleaning technologies used in the MAGS process are conventional and do not need to be discussed any further herein.

At the end of a batch cycle, all the organic waste placed in the MAGS has been fully gasified. The residue, containing any incidental metal and glass found in the original waste plus the ash, is recovered as a sterilized inert material that can be either stored or safely discharged according to local regulations. Some inorganic carbon may be left in the ash in order to minimize emissions of greenhouse gases.

The MAGS reactor does not use any refractory to insulate the walls. Consequently, the reactor has minimum thermal inertia and can be heated-up or cooled-down very quickly and the down time between processing cycles is minimized. A typical MAGS reactor, capable of treating 40 kilograms of waste per batch, will heat-up or cool-down in less than 15 minutes. The full processing cycle for a batch is about 120 minutes. Alternatively, an insulation for the system may be used. The insulation is based on wrapping a ceramic fibre blanket on the outside of the system (i.e. outside the outer walls of the primary and secondary gasifiers). In that case, the function of the insulation is primarily to protect an operator from the heat.

A stirring mechanism (such as a screw or any other similar design) can be incorporated into the design of the MAGS reactor. The function of the stirring mechanism is to both mix the waste during operation and to remove the ash from the reactor at the end of the cycle.

BRIEF DESCRIPTION OF DRAWINGS

These and other details of the present invention will become clearer from the following detailed description in which reference is made to the appended drawings in which.

DETAILED DESCRIPTION OF THE INVENTION

Figure 1:
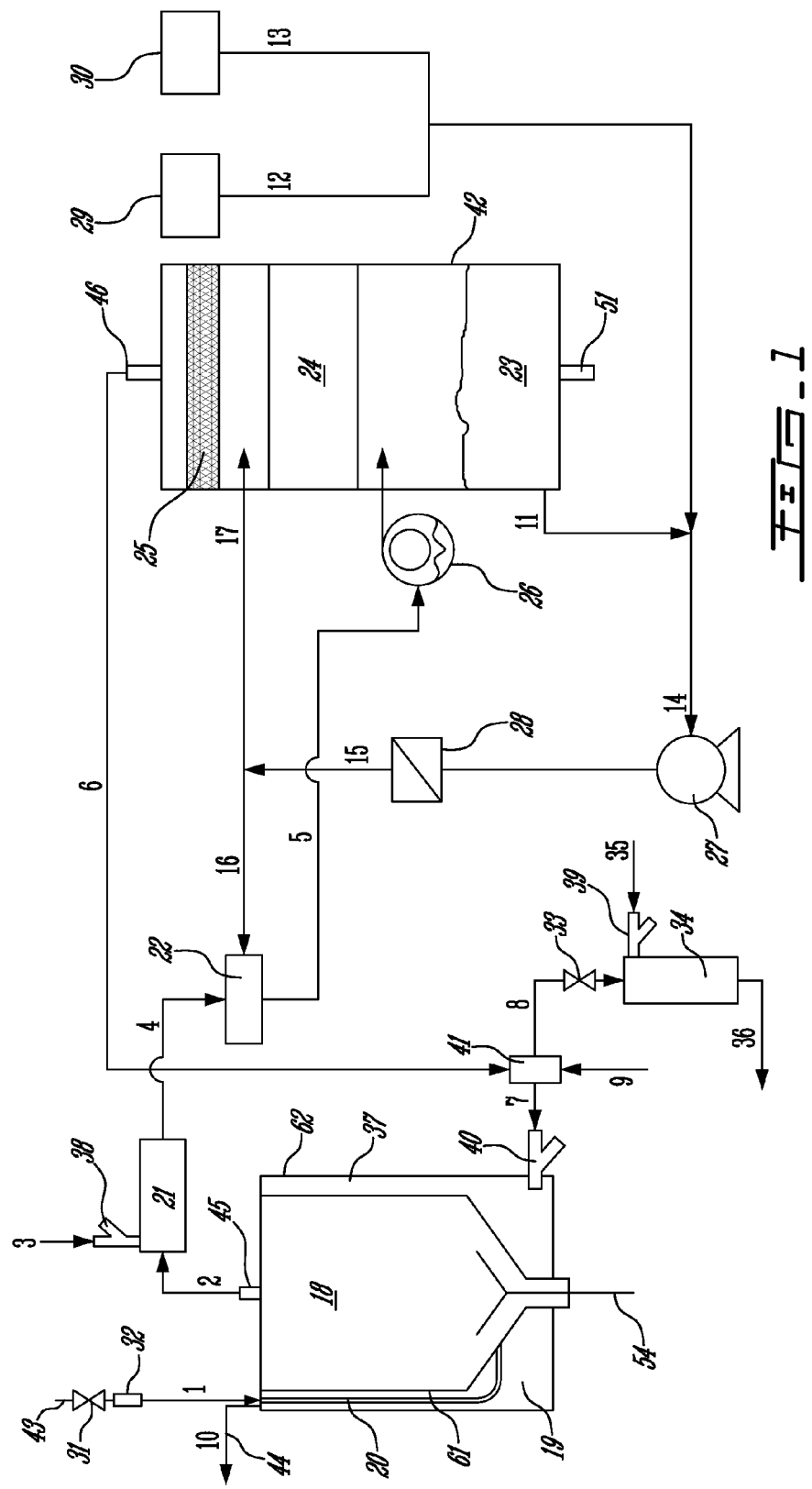
FIG. 1 is a schematic block diagram illustrating an embodiment of the present invention.

FIG. 1 shows a block diagram of one embodiment of the MAGS process as disclosed herein. A waste, without any prior pre-treatment, is placed into the primary gasification chamber 18 of the primary gasification reactor 37. A mixture 9 of fuel, such as propane and air, is fed through a combustible gas selector 41 into a dual-fuel burner 40 where it is burned in the primary combustion chamber 19 to start the gasification process. The process air 1 used for the gasification of the waste is fed through the passage 20 between the primary gasification chamber wall 61 and the primary combustion chamber wall 62. The gasification chamber 18 operates under negative pressure (approximately −10″ $H_2O$) created by the use of a water ring pump 26, which pumps the crude synthesis gas 2 out of the gasification chamber 18. The process air 1 is allowed to be drawn into the primary gasification reactor 37 using the pressure difference between the pressure in the primary gasification chamber 18 and the ambient atmospheric pressure. A flow control valve 31 and a flow measuring device 32 are installed at the inlet 43 of the process air line to control the amount of air being drawn into the primary gasification reactor 37. A controller is used to set the flow in the process air flow control valve 31. The composition of the synthesis gas (i.e. the $CO/CO_2$ ratio) is measured at the outlet of the secondary gasification chamber 21. The process air 1 is controlled to produce a gas rich in CO. The hot combustion exhaust gases 10, at about 1,000° C., pass between the primary gasification chamber wall 61 and the external wall 62 and exit the primary gasification reactor 37 via a suitable flue or stack 44. The combustion exhaust gases heat up the wall of the process air passage 20, which, in turns, acts as a heat exchanger and heats up the process air 1 and the gasification chamber 18 to about 750° C. The waste is heated from both the pre-heated process air 1 and the hot primary gasification chamber walls and begins to gasify. The gasification of the waste produces a crude synthesis gas 2 which exhausts from the primary gasification chamber 18 through the exhaust pipe 45 connecting the primary gasification reactor 37 to the secondary gasification chamber 21.

The crude synthesis gas 2 is introduced into the secondary gasification chamber 21 where it is heated further to about 800° C. in order to convert any tars produced in the primary gasification chamber 18 into more synthesis gas. The heating of the crude synthesis gas 2 in the secondary gasification chamber 21 occurs using two energy sources. The first source of energy is a burner 38 that operates on a mixture 3 of a conventional fuel, such as propane, and air. The second source of energy is the exothermic gasification reactions between the crude synthesis gas 2 and excess air in the fuel/air mixture 3 that convert the tars into carbon monoxide and hydrogen.

The tars-free synthesis gas 4 exiting the secondary gasification chamber 21 is passed through a venturi quench 22 where it is cooled and is cleaned of any particulates. Water 16 is used to quench the crude synthesis gas 4 from about 800° C. to about 80° C. The cold and partially cleaned synthesis gas 5 is then fed into a scrubber 42 using the water ring pump 26. The synthesis gas passes through a packed column 24 and comes in intimate contact with water 17 containing various oxidizing agents 12 and 13, whereby the acid gases contained in the synthesis gas are removed. The clean synthesis gas is then passed through a demister 25 to remove any water droplets that may have been entrained in it. Through the scrubber gas outlet 46, the clean and dewatered synthesis gas 6 is then returned to the combustible gas selector 41 where it can be used as a fuel at the primary gasification reactor burner 40 to replace the conventional fuel used at the start of the process, or alternatively, diverted to a secondary combustion chamber 34 where it can be burned, or is available for other beneficial uses to the operator of the system.

The principle use of the clean synthesis gas 6 is as a fuel 7 to provide the energy needed in the primary gasification reactor 37. Any excess clean synthesis gas produced by the process must be diverted to other uses. If other beneficial uses are not available, a secondary combustion chamber 34 is used to fully combust the excess synthesis gas 8. When the temperature in the primary combustion chamber 19 exceeds 1,000° C., a control valve 33 opens and some of the synthesis gas is diverted into the secondary combustion chamber 34. A small burner 39 that operates on a mixture 35 of air and a conventional fuel, such as propane, is used to ensure the complete combustion of the excess synthesis gas 8.

The water used to quench and clean the synthesis gas 4 is circulated using a water circulation pump 27 or a similar device. The water is stored in a reservoir 23 that may be located at the bottom of the scrubber 42. Within the reservoir 23, the water can be cooled and conditioned as required by the process. The water exiting the reservoir at the scrubber water outlet 11 is mixed with various oxidizing chemicals 12 and 13, such as caustic or bleach or peroxide, which are kept in special reservoirs 29 and 30. The now oxidizing water 14 is fed into the water circulation pump 27. The oxidizing water 14 exiting the water circulation pump 27 is passed through a filter 28 to remove any accumulated particulates. The now filtered and oxidizing water 15 is then split into two streams 16 and 17. Stream 16 is used to quench the hot crude synthesis gas 4 while the second stream 17 is used to scrub the acid gases from the synthesis gas 5.

Figure 2:
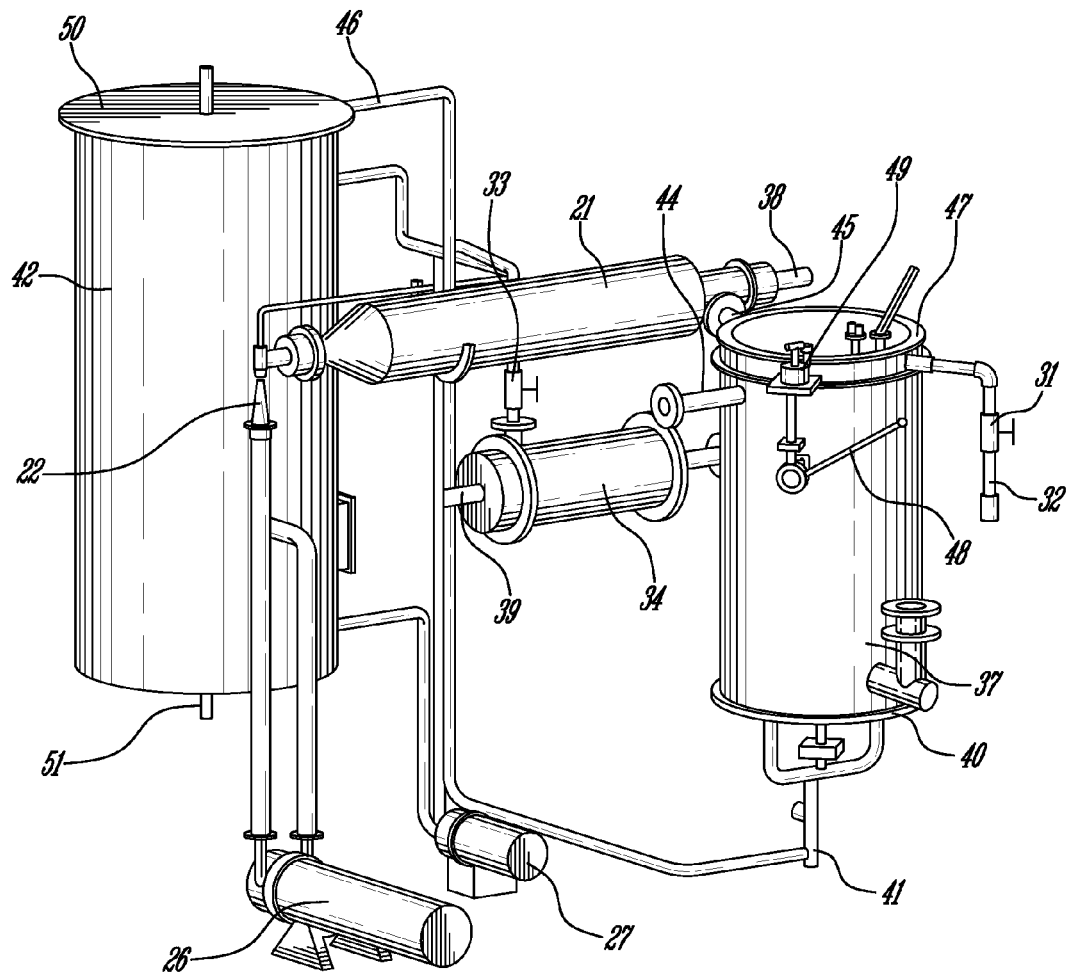
FIG. 2 is a perspective view of the waste gasification system according to an embodiment of the present invention.

Turning now to FIG. 2, there is shown a schematic of the major pieces of equipment that may be used in one embodiment of the MAGS process as disclosed herein. The unprocessed waste, still in the original garbage bags, is fed into the primary gasification reactor 37 by opening the access cover 47 prior to the beginning of the operation, using a hand operated lever 48, and manually placing the garbage bags in the reactor 37. The hand operated lever 48 uses a cam mechanism 49 to lift the cover 47 by approximately 1". Once the cover is free from the reactor, it swings to the side and reveals the opening of the reactor 37. The door may be designed to swing to either side, depending on the configuration required.

The dual-fuel burner 40 located underneath the primary gasification reactor is used to heat both the walls of the reactor 37 and the process air used for gasification. The dual fuel burner 40 can either use a common hydrocarbon fuel, such as propane, methane or diesel, or burn the synthesis gas produced by the MAGS process. Once the fuel is burned, it exits the MAGS furnace through its flue output 44 as hot but clean combustion exhaust gas. It may be released directly into the environment or quenched and then released.

In one embodiment of the present invention, the hot crude synthesis gas exits the MAGS primary gasification reactor 37 through the pipe 45 and is fed into the secondary gasification chamber 21 where it is heated further to remove tars. The hot but tars-free crude synthesis gas is fed into a venture 22 where it quenched. The cold crude synthesis gas is then fed into the scrubber 42 using a water ring pump 26 or a similar device. The water ring pump 26 is also used to ensure that the MAGS primary gasification reactor 37 and the secondary gasification chamber 21 are always maintained at a pressure that is slightly lower than atmospheric pressure. Acid gases are removed from the synthesis gas in the scrubber 42. The type of synthesis gas cleaning technology shown in FIGS. 1 and 2, herein, uses a wet scrubbing system and requires the quenching of the crude synthesis gas. Alternatively, the crude but tars-free synthesis gas may be cleaned, either while still hot or after a pre-cooling operation, using a dry scrubber. The clean and dewatered synthesis gas exits the scrubber 46 and is fed back into the combustion gas selector 41 from where the synthesis gas along with any mixture of conventional fuel and air can be directed to the dual fuel burner 40 located at the bottom of the primary gasification reactor 37 where it is burned to provide the energy for the process. Water is extracted from the bottom of the scrubber 42, which serves also as a water reservoir and circulated to the venture quench 22 as well as to the top of the scrubber 42 using a water circulation pump 27 or a similar device.

The top 50 of the scrubber 42 is flanged and can be opened. There is a drain 51 at the bottom of the scrubber 42 that allows for the removal of all the water and the cleaning of the system.

Any excess synthesis gas can be diverted from the system using a control valve 33 and burned in the secondary combustion chamber 34 using a conventional burner 39 to ensure complete combustion.

Part of the energy needed to heat up the crude synthesis gas in the secondary gasification chamber 21 is provided by a conventional fuel burner 38.

The process air flow into the primary gasification reactor 37 is controlled using a flow control valve 31 and a flow measuring device 32.

Figure 3:
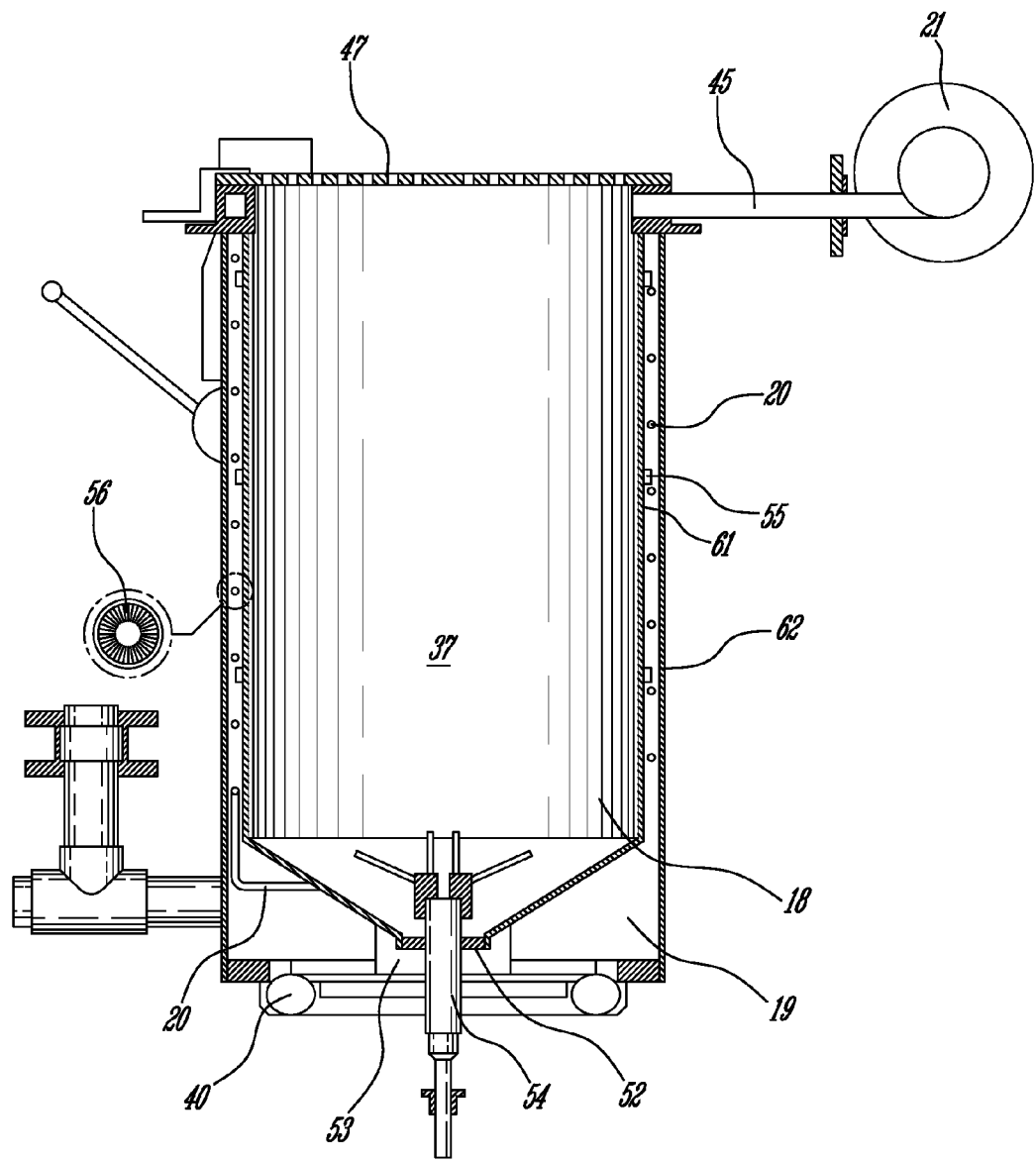
FIG. 3 is a cross-sectional elevation view of the MAGS primary gasification reactor of FIG. 2.

FIG. 3 shows a schematic of the two-stage MAGS reactor as disclosed herein, including the primary gasification reactor 37 and the secondary gasification chamber 21. The primary gasification reactor 37 can be divided into three chambers: the gasification chamber 18, the process air pre-heating chamber or passage 20 and the combustion chamber 19. Additionally, the primary gasification reactor 37 includes a manually operated access cover 47, through which the waste is placed inside the reactor 37, and a flange 52 at the bottom through which the waste mixing mechanism 54 may be installed. The bottom opening 52 is covered by a trap door 53. There may be basically three ways to remove ashes from the primary gasification chamber 18. First, a mechanical device, such as a screw impeller 54, may be provided at the bottom of the reactor 37 and used to remove the ashes. The screw impeller 54 may also be used for mixing the waste during processing. Second, the ashes may be removed by a trap door 53. A third solution is to use a specially designed vacuum cleaner (not shown) and suck everything from the top access into a bag that can afterward be disposed of appropriately. The MAGS reactor is based on a batch operation, that is it only processes waste per batch quantity and does not process it continuously like many large scale reactors. As such, the ash may be removed periodically prior to loading a new batch of waste.

Underneath the MAGS primary gasification reactor 37, as shown in FIG. 3, a dual fuel burner 40 is used to combust either a conventional hydrocarbon, such as propane, or the synthesis gas, and thus provide the energy used in the process. Alternatively, the burner for the conventional fuel maybe separate from the burner of the synthesis gas.

Once the waste has been placed inside the primary reactor 37 and the access cover 47 has been closed, the combustion of the fuel begins along with the feeding of combustion air. The combustion exhaust gasses pass through the combustion chamber 19 which surrounds the primary gasification chamber 18. The combustion chamber 19 includes the combustion zone located under the gasification chamber 18 and the passage between the external wall 62 and the primary gasification chamber wall 61 of the reactor 37. Fins or channels 55, or other similar designs, are used within the combustion chamber 19 to increase the efficiency by which heat is transferred from the combustion exhaust gases to the primary gasification chamber wall 61 and to the process air in the air pre-heating passage 20. Fins 56, channels, metal foams and other similar devices can be used to increase the heat transfer efficiency between the combustion exhaust and the process air.

The crude synthesis gas produced by the gasification of the waste in the primary gasification chamber 18 exits the MAGS primary gasification reactor 37 through an exhaust port 45 located at the top of the primary gasification reactor 37. The crude synthesis gas is heated further in a secondary gasification chamber 21 to eliminate any tars that may have been produced in the primary gasification chamber 18.

The processing rate of the MAGS gasification reactor is less than 20 lbs/hr per square foot. Of course, what MAGS lacks in processing capacity it gains in simplicity, since the MAGS technology does not require the pre-processing of waste or the operation of complex reactors such as fluidized beds.

The present invention has been described with regard to preferred embodiments. The description as much as the drawings were intended to help the understanding of the invention, rather than to limit its scope. It will be apparent to one skilled in the art that various modifications may be made to the invention without departing from the scope of the invention as described herein, and such modifications are intended to be covered by the present description.

The invention claimed is:

1. A gasification waste processor for processing organic waste, the processor comprising:
   a closed primary gasification chamber having a controlled process air inlet and a crude synthesis gas outlet, said primary gasification chamber having a latched hatch adapted to admit placement of bags of said waste in said primary chamber prior to gasification;
   a combustion chamber configured to combust an external fuel and synthesis gas produced in the primary gasification chamber for providing process heat to said primary gasification chamber by direct heat exchange between combustion gases and said primary gasification chamber;
   an electronic control system configured to control said combusting said fuel to ensure gasification of said organic waste and to control process air provided to said gasification chamber to control production of said synthesis gas so that the synthesis gas produced does not exceed what is needed to fuel the gasification of said waste heat requirements for gasification of waste in said gasification chamber, wherein supply and combustion of said external fuel is managed to no longer combust said external fuel when said heat from combustion of said synthesis gas is sufficient to produce said synthesis gas for heating said primary gasification chamber, and to complete gasification of said organic waste in said primary gasification chamber.

2. The processor as claimed in claim 1, further comprising:
   a secondary gasification chamber receiving said crude synthesis gas and treating same to reduce tar content and produce outlet synthesis gas; and
   a decontamination unit for decontaminating said outlet synthesis gas, wherein said electronic control system is configured to control operation of said secondary gasification chamber to drive a closed cycle of processing of said waste.

3. The processor as claimed in claim 2, further comprising a synthesis gas management system for managing said synthesis gas to be combusted in said combustion chamber, said gas management system replacing the supply of external fuel with said synthesis gas as synthesis gas is available during processing of said waste.

4. The processor as claimed in claim 3, wherein said external fuel is a fuel gas, and said synthesis gas is combusted in a same burner of said combustion chamber as said external gas supply.

5. The processor as claimed in claim 3, wherein said external fuel is a liquid fuel, and said synthesis gas is combusted in a different burner of said combustion chamber as a burner for said external fuel.

6. The processor as claimed in claim 1, further comprising a process air pre-heat unit for heating said process air.

7. The processor as claimed in claim 6, said pre-heat unit comprising a heat exchanger for exchanging heat with flue gas originating from said combustion chamber.

8. The processor as claimed in claim 7, wherein:
   said process air is introduced into said primary gasification chamber in a manner to contact and heat said waste;
   said primary gasification chamber is made of stainless steel; said combustion chamber is adapted to provide said heat to said primary gasification chamber to reach a temperature near a maximum operating temperature higher than which said stainless steel undergoes rapid oxidation; and
   gasification in said primary gasification chamber being aided by said circulating of said heated process air.

9. The processor as claimed in claim 1, further comprising an ash removal mechanism located at a bottom of said primary gasification chamber.

10. The processor as claimed in claim 1, wherein said decontamination unit comprises a wet scrubber.

11. The processor as claimed in claim 1, wherein said primary gasification chamber comprises an impeller for mixing said waste.

12. The processor as claimed in claim 1, wherein said primary gasification chamber is a cylinder arranged in a vertical position, said combustion chamber surrounds said primary gasification chamber, and a burner of said combustion chamber is located at a bottom of said primary gasification chamber.

13. The processor as claimed in claim 12, wherein a cylindrical side wall of said primary gasification chamber forms part of a flue of said combustion chamber.

14. A method of processing waste by gasification, the method comprising:
providing organic waste in a primary gasification chamber;
combusting an external fuel at a beginning of said gasification to heat said primary gasification chamber by heat exchange between combustion gases from combusting said external fuel and an outside of said primary gasification chamber to bring said organic waste in said primary gasification chamber up to a gasification temperature and produce a synthesis gas;
combusting said synthesis gas produced from said organic waste in said primary gasification chamber to heat said gasification chamber by heat exchange between combustion gases from combusting said synthesis gas and an outside of said gasification chamber;
controlling a supply of said external fuel to replace said external fuel by said synthesis gas as it is produced;
controlling the amount of process air fed to the primary gasification chamber to reduce the amount of synthesis gas produced when the production of synthesis gas exceeds what is needed to fuel the gasification of said waste so that no synthesis gas is produced in excess of what is needed for gasification of said waste.

15. The method as claimed in claim 14, wherein said organic waste is provided in said chamber without prior mechanical commutation or dessication.

16. The method as claimed in claim 15, wherein said organic waste is placed manually in said chamber in one or more plastic garbage bags used for collecting said waste.

17. The method as claimed in claim 14, wherein process air fed into said chamber is preheated.

18. The method as claimed in claim 17, wherein said process air is heated using flue gas from a combustion chamber for heating said primary gasification chamber.

19. The method as claimed in claim 17, wherein said primary gasification chamber is heated to reach a temperature near a maximum operating temperature higher than which a material of said primary gasification chamber undergoes rapid oxidation, gasification in said primary gasification chamber being aided by said preheated process air.

20. The method as claimed in claim 14, wherein said gasifying comprises mixing said waste in said primary gasification chamber during the gasification process.

21. The method as claimed in claim 14, wherein said synthesis gas is processed by a secondary gasification chamber and a scrubber to produce clean synthesis gas.

* * * * *